United States Patent
Juda et al.

(10) Patent No.: US 8,780,395 B1
(45) Date of Patent: Jul. 15, 2014

(54) PRINTING ONLINE RESOURCES

(75) Inventors: Adam I. Juda, New York, NY (US);
Prem Ramaswami, Branchburg, NJ (US)

(73) Assignee: Google Inc., Mountain View, CA (US)

(*) Notice: Subject to any disclaimer, the term of this patent is extended or adjusted under 35 U.S.C. 154(b) by 165 days.

(21) Appl. No.: 13/448,563

(22) Filed: Apr. 17, 2012

(51) Int. Cl.
*G06F 3/12* (2006.01)
*G06K 15/00* (2006.01)
*H04N 1/46* (2006.01)

(52) U.S. Cl.
USPC ......... 358/1.15; 358/1.1; 358/1.13; 358/1.18; 358/537

(58) Field of Classification Search
USPC ......... 358/1.15, 1.18, 1.9, 1.13, 1.1, 1.4, 401, 358/402, 452, 476, 537, 538; 705/14.72, 705/14.54, 14.64, 14.58, 14.57, 14.56, 705/14.73, 14.4, 14.46, 14.69, 14.1, 14.37, 705/14.38; 715/243, 238, 776, 200, 203, 715/251, 253, 784, 787, 771, 772
See application file for complete search history.

(56) References Cited

U.S. PATENT DOCUMENTS

| | | | |
|---|---|---|---|
| 7,831,454 B2 * | 11/2010 | Nguyen et al. | 705/7.34 |
| 7,835,939 B1 * | 11/2010 | Karlsson | 705/7.31 |
| 8,189,225 B1 * | 5/2012 | Lo et al. | 358/1.15 |
| 2004/0130744 A1 * | 7/2004 | Wu et al. | 358/1.15 |
| 2007/0061195 A1 | 3/2007 | Liu et al. | |
| 2007/0094363 A1 | 4/2007 | Yruski et al. | |
| 2009/0021790 A1 * | 1/2009 | Krovitz et al. | 358/1.18 |
| 2011/0007347 A1 * | 1/2011 | Kamath et al. | 358/1.15 |
| 2011/0066487 A1 * | 3/2011 | Charania | 705/14.43 |
| 2011/0222104 A1 * | 9/2011 | Mohammad et al. | 358/1.15 |
| 2012/0036015 A1 * | 2/2012 | Sheikh | 705/14.54 |
| 2012/0101904 A1 * | 4/2012 | Spooner et al. | 705/14.72 |
| 2012/0300249 A1 * | 11/2012 | Shustef et al. | 358/1.15 |

* cited by examiner

*Primary Examiner* — Ngon Nguyen
(74) *Attorney, Agent, or Firm* — Fish & Richardson P.C.

(57) ABSTRACT

Methods, systems, and apparatus, including computer programs encoded on a computer storage medium, for printing online resources. In one aspect, a method includes receiving a request to print an online resource that is presented at a user device according to a presentation format in which a first advertisement is presented at a first presentation position. A print format for a print-out of the online resource is selected. The print format specifies a second advertisement position at which a second advertisement is included in the print-out of the online resource. The second advertisement is selected based, at least in part, on characteristics of the second advertisement position. The second advertisement can be a different advertisement than the first advertisement. Data that cause the resource and the second advertisement to be printed according to the print format are provided.

19 Claims, 4 Drawing Sheets

PRINTING ONLINE RESOURCES

BACKGROUND

This document relates to data processing.

The Internet provides resources to users for informative and recreational purposes. The Internet can connect user devices with remote servers that provide content of various kinds. The servers can also be connected to devices, such as printers. Users can connect printers to the Internet and register the printers with servers. In this way, users can print to the printers through the servers, from any user device connected to the server via the Internet. Thus, users can print to printers from remote locations or to remote locations.

SUMMARY

In general, one innovative aspect of the subject matter described in this specification can be embodied in methods that include the actions of receiving, from a computing device, a request to print an online resource that is presented at a user device according to a presentation format in which a first advertisement is presented at a first presentation position; selecting, by a data processing apparatus, a print format for a print-out of the online resource, the print format specifying a second advertisement position at which a second advertisement is included in the print-out of the online resource; selecting, by a data processing apparatus, the second advertisement based, at least in part, on characteristics of the second advertisement position, the second advertisement can be a different advertisement than the first advertisement; and providing data that cause the resource and the second advertisement to be printed according to the print format. Other embodiments of this aspect include corresponding systems, apparatus, and computer programs, configured to perform the actions of the methods, encoded on computer storage devices.

These and other embodiments can each optionally include one or more of the following features. Methods can further include the actions of determining that a print-out of the online resource will not comply with specified print-out parameters when the online resource is printed according to the presentation format. Selecting the print format can be performed in response to the determination that the print-out will not comply with the specified print-out parameters.

Methods can further include the actions of determining that a portion of the online resource will be occluded by the first advertisement when the online resource is printed by the cloud printer according to the presentation format. Selecting the print format can be performed in response to the determination that the portion of the online resource will be occluded.

Methods can further include the actions of determining that a first number of pages used by the cloud printer to print the online resource according to the presentation format is greater than a second number of pages used by the cloud printer to print the online resource according to the print format. Selecting the print format can be performed in response to the determination that the first number of pages is greater than the second number of pages.

Receiving a request to print an online resource can include receiving a request specifying a cloud printer to which the online resource is to be printed. The cloud printer can be connected to a different local area network than the computing device. Selecting the second advertisement can include selecting an advertisement provided by an advertiser that has a business location that is within a threshold distance of a geographic location of the printer. Selecting the second advertisement can include selecting a print version of the first advertisement in which an interactive element of the first advertisement that initiates a resource request in response to online user interaction with the first advertisement is replaced with a printed element that provides printed information to the user. Selecting the second advertisement can include selecting, as the second advertisement, a print version of the first advertisement that includes a QR code. Selecting the second advertisement can include selecting an advertisement that includes a coupon for a business that is redeemable when presented at a physical geographic location at which the business operates.

Selecting a print format can include generating a plurality of formats for the print-out of the online resource; and selecting the print format from among the generated plurality of formats based on features of each of the formats, the features for each of the formats specifying at least one of estimated revenues from the advertisements that are presented according to the format, a number of pages needed for printing the online resource according to the format, and a ratio of space allocated to advertisements relative to space allocated for the resource.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
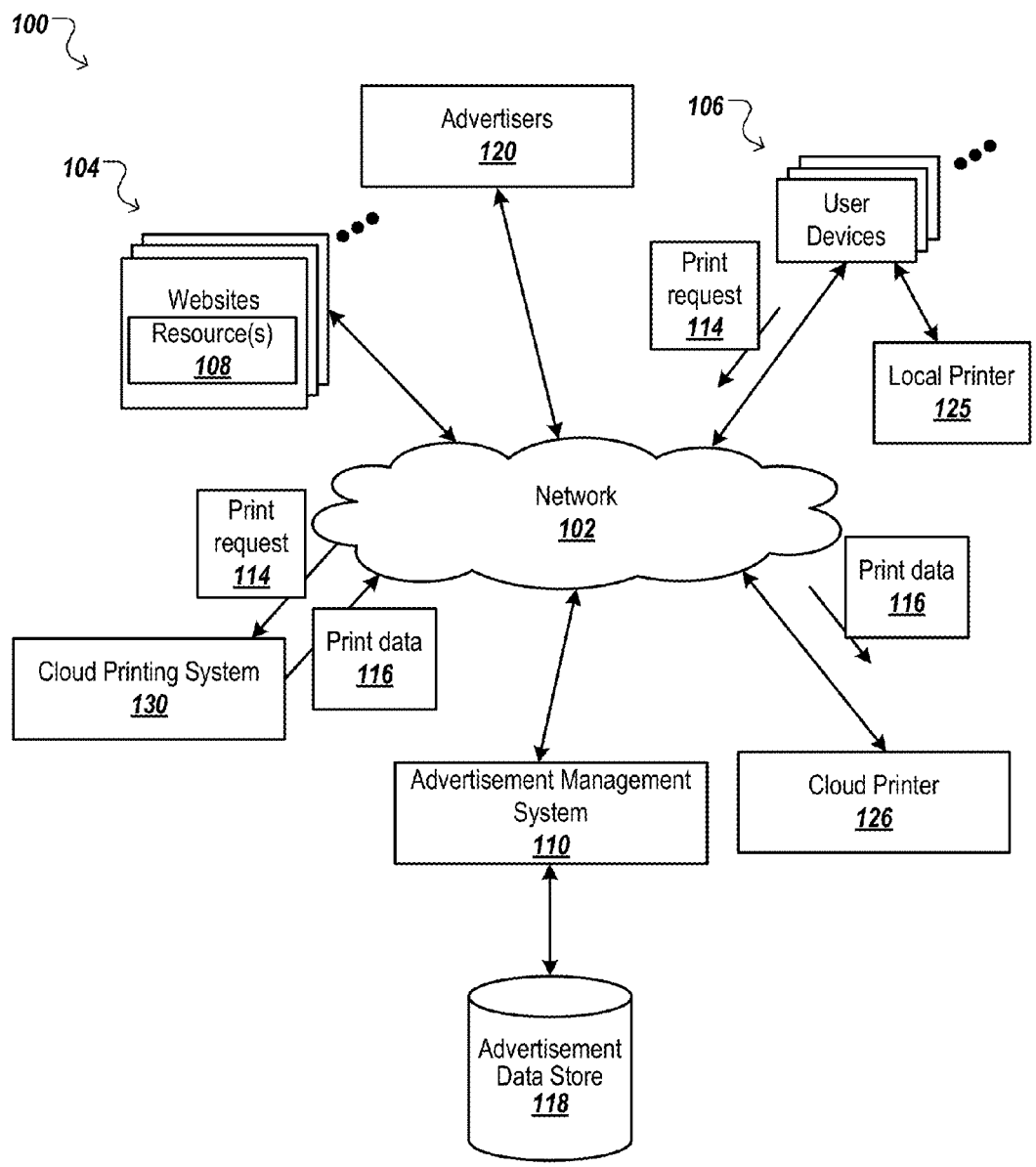
FIG. 1 is a block diagram of an example environment in which cloud printing system provides printing services.

Resources available over the Internet are often presented with advertisements, and the advertisements can be related to the content of the resource and/or selected based on characteristics of a user to which the resource was provided. The resource and the advertisement are often formatted for presentation on display devices and computing devices such as monitors, laptops, and mobile phones. When a user prints the resource to paper according to the presentation format (i.e., the format with which the resource and advertisements are presented by a computing device), the format of the resource may cause images to be split between pages, too wide for one sheet of paper, or portions of the online resource may be occluded by advertisements or other portions of content. Therefore, it may be difficult to read text of a resource that has been printed according to the presentation format or to view related advertisement material. Similarly, it may be difficult to view images that are included in the resource and/or difficult to view the advertisements that are presented with the resource when the print-out of the resource is formatted according to the presentation format.

Cloud based printing services enable users to print documents to printers that are connected to the Internet. For example, a user can register a printer that is connected to the Internet with a cloud-based printing service that is provided by a cloud-printing system. A printer that has been registered with a cloud-based printing service is referred to throughout this document as a cloud printer. A user can print to a cloud printer from virtually any computing device that is connected to the Internet, such that the user can print to the cloud printer even when the user is unable to connect to a same local area network as the cloud printer. During the registration process, the user can select security and access control features that are used to selectively restrict which users are able to print to the cloud printer.

As described in more detail below, the cloud based printing service can be implemented to determine whether a print-out of the resource will be formatted according to the presentation format that was used to present the resource at a computing device, or whether the print-out will be formatted according to a different format. For example, when a user requests that a resource be printed at a cloud printer, the cloud-based printing service can examine characteristics of the presentation format and reformat the resource for printing on paper.

The reformatting can include changing resource display attributes such as text size, image size, column widths, a number of advertisement slots that are included in the resource, placement positions of the advertisement slots (including on which pages the advertisement slots appear), and margin sizes so that the content of the resource is formatted to fit within the dimensions of the paper on which the resource will be printed. Additionally or alternatively, the reformatting can include modifying display attributes of the advertisements that are selected for presentation.

The advertisement display attributes can include size and shape of the advertisements. The advertisement display attributes can also specify the content of the advertisement. For example, the advertisement display attributes can specify whether the advertisement includes only textual elements, only image elements, or a combination of textual and image elements. Additionally, the advertisement display attributes can specify whether advertisements that include active links (e.g., hypertext links that redirect a user to a location of another resource) be modified to include quick response (QR) codes, as printed QR codes can be more useful on sheets of paper than printed hyperlink strings. Advertisement content can also be modified to further utilize the paper format, for example, by including coupons that can be used for purchasing products or services. In some implementations, advertisements can include an online version and a paper version, which the ad management system can select from accordingly.

In some implementations, format selection and/or advertisement selection for a print-out of a resource, as discussed throughout this document, is performed, for example, prior to presentation of the resource or in response to a request for presentation of the resource. In turn, data representing the selected format and/or selected advertisement(s) can be provided with the resource. In response to a request to print the resource, e.g., at a cloud printer or a local printer, such as a Universal Serial Bus (USB) printer, the data representing the selected format and/or selected advertisement(s) selected format and advertisements can be used for printing the online resource. Thus, the format selection and advertisement selection discussed throughout this document can be performed when printing to either a cloud printer or a local printer that is connected to a user device through a local connection. Additionally, or alternatively, advertisement selection can be performed in response to receipt of a print request specifying that an online resource will be printed at a local printer.

FIG. 1 is a block diagram of an example environment 100 in which cloud printing system 130 provides printing services. The example environment 100 includes a network 102, e.g., a local area network (LAN), wide area network (WAN), the Internet, or a combination of them, connects web sites 104, user devices 106, an advertisement management system 110, a cloud printer 126, and advertisers 120. The environment 100 may include any number of web sites 104, user devices 106, and cloud printers.

A web site 104 is one or more resources 108 associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource 108 is any data that can be provided over the network 102. A resource 108 is identified by a resource address that is associated with the resource 108. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts). Units of content that are presented in (or with) resources are referred to as content items. An example of a content item is an advertisement that is presented with a resource.

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102.

The environment 100 also includes an advertisement management system 110 that is operable to provide advertisements for presentation in response to advertisement requests. For example, advertisers 120 can provide advertisements to the ad management system 110, and also provide information, such as keywords and/or bids with which the advertisement management system 110 can select advertisements to be provided in response to a particular advertisement request. For example, an advertiser 110 may specify that a particular advertisement is only eligible for presentation with a resource that is related to the topic "sports". In this example, the advertisement management system 110 will only select the particular advertisement for presentation when the advertisement request (or other information) indicate that the resource with which the requested Advertisements may be provided by the advertisement management system 110 through various mediums and in various forms. In some examples, advertisements ("ads") may be communicated through an interactive medium, such as the Internet, and may include graphical ads (e.g., banner ads), textual ads, image ads, audio ads, video ads, ads combining one of more of any of such components, or any form of electronically delivered advertisement. Ads may include embedded information, such as embedded media, links, meta-information, and/or machine executable instructions. Ads can also be communicated through RSS (Really Simple Syndication) feeds, radio channels, television channels, print media, and other media.

In response to receiving an advertisement request for an advertisement to be presented with a resource, the advertisement management system 110 can use the information provided by the advertisers 120 as well as attributes of the advertisements to select the advertisements that will be provided in response to the advertisement request. For example, the advertisement management system 110 can determine, based on the information included in the advertisement request, a size of the advertisement slot in which the selected advertisement will be presented. Using this information, the advertisement management system can select advertisements having size attributes that match the size of the advertisement slot. In turn, the advertisement management system 110 can provide data identifying the selected advertisement and/or data that cause presentation of the selected advertisement to the user device at which the resource and the advertisement will be presented.

Once the resource and/or advertisement has been presented at the user device 106, the user device 106 may submit a print request 114 to a printer that causes the resource and/or advertisement to be printed by the printer. The print request can be provided to either a local printer 125 or to a data processing apparatus such as the advertisement management system 110 or a cloud printing service 130. The cloud printing system 130 enables a user device 106 to print resources (or other documents) to a cloud printer 126 that has been registered with the cloud printing system 130. For example, the cloud printing system 130 can receive the print request 114 from the user device 106, determine a network location of the cloud printer 126 to which the user device 106 is authorized to print, and transmit print data 116 to the cloud printer 126. The print data 116 is data that causes the cloud printer 126 to print the resource (or other document) that was specified in the print request 114.

As noted above, resources 108 that are presented on user devices 106 are formatted according to a presentation format that has been selected based on display characteristics of the user device 106 that has requested presentation of the resource 108. If the resource 108 and/or advertisements presented with the resource 108 are printed to paper using this same presentation format, it is possible that the printed version of the resource and/or printed versions of the advertisements will be difficult to view once printed. Additionally, the advertisements that are presented with the resource at the user device 106 may be less effective in a printed form since users will not be able request presentation of the resource to which the advertisement is linked through interaction with the advertisement.

Figure 2A:
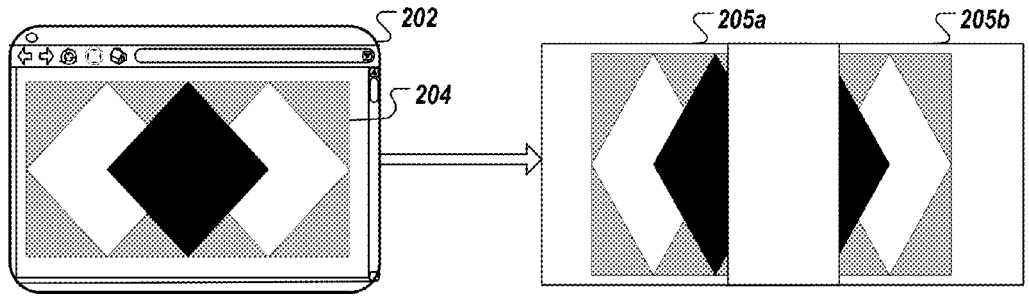
FIGS. 2A and 2B illustrate example printing errors that may be encountered when a resource is printed according to the presentation format that was used to present the resource at a user device.
Figure 2B:
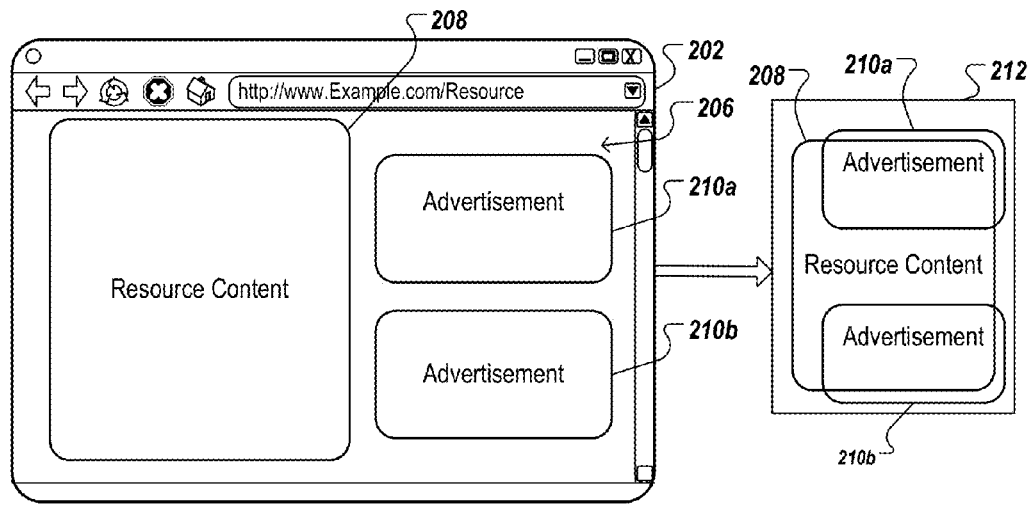

FIGS. 2A and 2B illustrate example printing errors that may be encountered when a resource is printed according to the presentation format that was used to present the resource at a user device. For example, as illustrated by FIG. 2A, assume that a resource is presented in a user interface 202, and that the resource includes an image 204. The presentation format of this resource may specify an aspect ratio for the image 204 that results in the image being fully presented on a display having a particular aspect ratio (e.g., a display having a 16:9 aspect ratio). If the resource is printed to 8.5"×11" paper using the aspect ratio specified by the presentation format, the print-out of the image 204 may be spread across two pages 205a and 205b.

FIG. 2B is an illustration of a print error that can be encountered when printing a resource that includes advertisements. For example, assume that a resource 206 includes resource content 208 (e.g., text, images, scripts, and/or multimedia content) as well as advertisements 210a and 210b that are presented in advertisement slots. In this example, the presentation format for the resource may have been selected such that the resource content 208 and the advertisements 210a and 210b are each fully presented on a single screen of the user interface 202, such that the user need not scroll to view either the resource content 208 or the advertisements 210a and 210b. In this example, printing the resource according to the presentation format may result in the resource content 208 and the advertisements 210a and 210b being printed on a single page 212, but the advertisements 210a and 210b may end up being printed in a manner that occludes a portion of the resource content 208.

Referring again to FIG. 1, the cloud printing system 130 is implemented to select a print format for a print-out of an online resource, where the print format is different from the presentation format. The print format can be selected, for example, based on print settings for the cloud printer 126 at which the resource will be printed. For example, the cloud printing system 130 can analyze the resource to be printed and the print settings to select a print format that reduces the likelihood that print errors similar to those described above with reference to FIGS. 2A and 2B (or other print errors) are encountered when the resource is printed at the cloud printer 126. The print settings of the cloud printer 126 can be specified by the user either through a user interface of the cloud printing system 130 or at the cloud printer 126. When the print settings are specified at the cloud printer 126, the cloud printing system 130 can be configured to communicate with the cloud printer 126 in order to obtain the print settings.

In some implementations, the print format can be specified prior to a request for the resource, and data specifying the print format can be provided with the resource in response to a request for the resource. For example, the publisher of the resource may specify a print format for a resource that differs from the presentation format of the resource.

Alternatively, or additionally, the cloud printing system 130, or another data processing apparatus, can be used to identify the print format for the resource, and this data can be provided to user devices that request the online resource. For example, the data specifying the print format can be stored in the advertisement data store 118 with a reference to the resource for which the print format was selected.

When a request for advertisements to be provided with the resource is received by the advertisement management system 110, the data specifying the print format can be selected and provided with an advertisement that is selected for presentation with the resource. Additionally, one or more additional advertisements can be provided for inclusion in a print-out of the resource that will be formatted according to the print format. The one or more additional advertisements can be different advertisements than those selected for presentation of the resource at the user device.

Figure 2C:
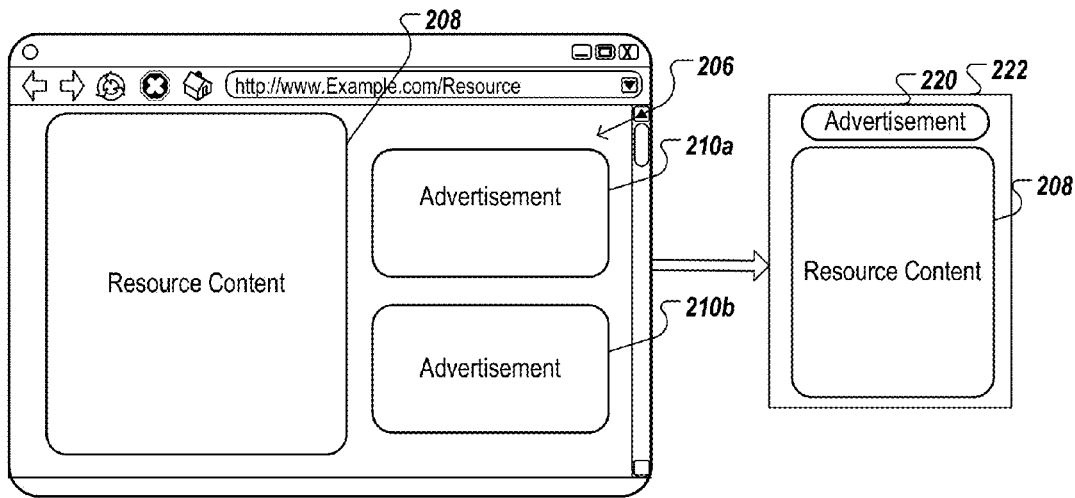
FIG. 2C is an illustration of a resource print-out that has been formatted according to a print format that differs from the presentation format for the resource.

FIG. 2C is an illustration of a resource print-out that has been formatted according to a print format that differs from the presentation format for the resource. As illustrated by FIG. 2, the print format includes a single advertisement 220 that is located at the top of the print-out 222, whereas the presentation format for the resource when presented on a user device includes two advertisement slots 210a and 210b that are positioned vertically down the right-hand side of the resource 206. In this example, formatting the print-out 222 of the resource according to a print format that differs from the presentation format enables the resource content 108 and the advertisement 220 to be presented on a single printed page. Note that the number and positions of advertisements are used for example purposes only, and that other numbers of advertisements (including zero advertisements) may be included, and that the positions of any advertisements can vary.

As discussed above, the effectiveness of advertisements may vary based on the type of media in which the advertisements are presented. For example, coupons or other types of advertisements may be more effective in printed media than printouts of advertisements that include hypertext links to resources from which users can obtain additional information. Additionally, the advertisements that are presented with the printed version of the resource may be required to have different dimensions than the advertisements that were selected for presentation with the resource when displayed at a user device. Therefore, the advertisements that are selected for presentation with the printed version of the resource may differ from those that were selected for presentation with the resource when displayed at a user device.

When the cloud printing system 130 receives a print request 114, the cloud printing system can request advertisements to be presented in the printed version of the resource. In response, the ad management system 110 accesses the advertisement store 118, which stores a set of available advertisements, or sends a request to the advertisers 120 to identify advertisements that are predicted to be relevant to the content of the resource being printed or to the user requesting printing. The ad management system 110 selects advertisements, formats the resource and the advertisements, and sends data identifying the selected advertisements to the cloud printing system 130. In turn, the cloud printing system 130 includes data representing the selected advertisements in print data 116, and transmits the print data 116 to the cloud printer 126. The print data includes information (e.g., information representing the resource content and information representing the advertisements) to be printed, as well as instructions that cause the cloud printer 126 to print the information.

Selection of advertisements for inclusion in a printout of a resource can also be performed when the request for the resource is initially received, or before receipt of the request, and data specifying the advertisements to be included in the printout of the online resource can be provided to the user device prior to receipt of the print request. Similarly, the selection of advertisements for inclusion in a printout of a resource can be performed when a print request is received (e.g., by the advertisement management system 110) indicating that the resource will be printed at a local printer for a user device (e.g., a printer that is physically connected to the user device or a printer that is connected to a same local area network as the user device). For example, when a resource will be printed at a local printer, the user device can provide the print request to the advertisement management system 110, and the advertisement management system can select one or more advertisements to be included in the printout of the resource.

In some implementations, the advertisers 120 or the publishers of the websites 104 (instead of or in addition to the cloud printing service) can process the print requests 114 and request ads that are formatted for printing from the ad management system 110. For example, the publishers can receive the print requests 114 to print resources 108. The publishers can reformat the resources 108 for printing, leaving spaces for print advertisements. The publishers can, in turn, submit to the ad management system 110 an ad request including ad parameters. The ad parameters can include, for example, a subject or type of ad, a size and dimension of an ad, and whether the ad is for online display or for printing. The publisher can also include cookies of the user devices 106 to the ad management system 110 to more effectively provide the selected ads to be printed to users that will find value in the selected ads. The ad management system 110 can use scoring and ranking algorithms and/or an auction system to select the ads to provide to the website 104 for printing. The website 104 can receive the ads formatted for printing from the ad management system 110 and send the print data 116 to the printers 126.

Figure 3:
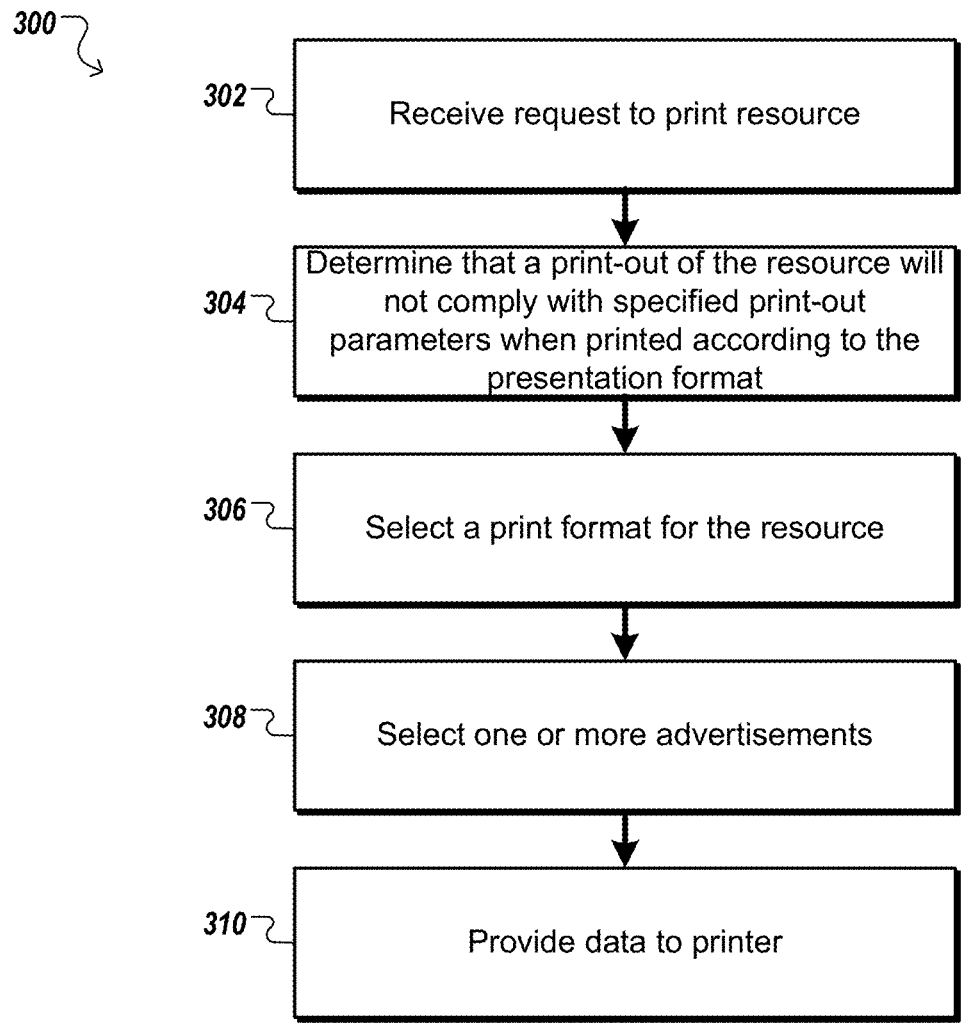
FIG. 3 is a flowchart of a process for printing online resources.

FIG. 3 is a flowchart of a process 300 for printing online resources. The process 300 may be performed by, for example, the ad management system 110 of FIG. 1. In some implementations, the ad management system 110 is a data processing apparatus that includes one or more processors that are configured to perform actions of the process 300. In some implementations, a non-transitory computer readable medium can include instructions that when executed by a computer cause the computer to perform actions of the process 300.

A print request to print an online resource is received (302). The print request can be received, for example, by the cloud printing system 130 and/or the advertisement management system 110 of FIG. 1. The request can specify the resource to be printed by providing a link (e.g., a hyperlink including a uniform resource locator (URL)) to the resource or by providing data comprising the resource. If the request includes a link to the resource, the cloud printing system can retrieve the resource from the location specified by the link.

The resource to be printed will have a presentation format that is used to control the manner in which the resource is presented at a user device. The presentation format can specify, for example, presentation positions for resource content that has been provided by the publisher of the resource and presentation positions for advertisements that are selected for presentation with the resource when displayed at a user device. The presentation format may also specify a number of advertisements that are to be presented with the resource when displayed at a user device.

The print request can also specify a cloud printer to which the resource is to be printed. The cloud printer can be a printer that is connected to a different local network than the computing device that submitted the print request. For example, the computing device may be connected to a local network for a hotel in California at which the user is staying, while the cloud printer may be connected to a local network at the user's house in New York.

In some implementations, the print request can specify that the online resource will be printed to a local printer to which the user device is connected. For example, in response to user request to print the online resource, the user device can generate a print request that is provided, for example, to the advertisement management system 110. The print request can specify a brand and model of the local printer that will be used to print the online resource and/or print settings for the local printer, and include a request for an advertisement to be included in a printout of the online resource and/or a print format for the online resource.

In some implementations, the process 300 can optionally determine that a print-out of the resource will not comply with specified print-out parameters when printed according to the presentation format (304). The specified print-out parameters can specify, for example, that resource content (e.g., content provided by the publisher) not be occluded by advertisements that are presented with the resource.

The specified print-out parameters can also specify a threshold number of pages that are used to print the resource. The threshold number of pages can be selected, for example, based on a number of pages required to print the resource (with or without advertisements) according to a format other than the presentation format. For example, assume that 3 pages would be required to print the resource according to the presentation format, but only 2 pages would be required to print the resource according to a different format. In this example, the threshold number of pages could be set to 2 pages.

The threshold number of pages can alternatively, or additionally, be selected, for example, based on a minimum number of pages that would be required to print the resource without advertisements. For example, if two pages were required to print the resource without any advertisements, the threshold number of pages may be set equal to 2 (i.e., the minimum number of pages), or alternatively set equal to 3 (i.e., minimum number of pages +1).

A print format is selected for the resource (306). In some implementations, the print format is selected in response to determining that the print-out will not comply with the specified print-out parameters when printed according to the presentation format. For example, the selection of the print format can be performed in response to determining that a portion of the online resource will be occluded by the first advertisement when the online resource is printed by the cloud printer according to the presentation format. The selection of the print format can also, or alternatively, be performed in response to determining that the number of pages that would be used by the cloud printer to print the online resource according to the presentation format is greater than the number of pages that would be used by the cloud printer to print the online resource according to the print format.

The print format can be provided by the publisher or selected for the publisher based on the resource content and characteristics of the available advertisements. For example, the publisher can specify a print format for its resource that indicates a number of advertisements that can be presented with the print-out of the resource and/or locations of the advertisements that can be presented with the resource. Alternatively, the publisher can authorize reformatting of their resource in a manner that reduces the likelihood that a print-out of the resource will not comply with the specified print-out parameters. For example, as illustrated by FIGS. 2A-2C, the publisher can authorize a cloud printing system or advertisement management system to rearrange and/or resize the resource content and/or advertisement slots such that the resource content is not occluded by the advertisements and that resource content is not split across multiple pages.

The print format that is selected for the resource can be a format that results in the resource being formatted for printing in compliance with the specified print-out parameters. For example, the resource can be resized or paginated such that information is not cut between pages. Any text on the resource can be resized and column and margin widths can be modified. Ads can be placed alongside the resource, also paginated such that ads are not cut off between pages. For example, the ad can be a banner across the top of the page, sized to fit the width of the page, with the resource placed below the ad. In another example format, the first quarter of the width of the page can be reserved for several block ads placed in a column. The resource can be printed on the remainder of the page.

In some implementations, the selection of a print format can include generating several formats for a resource and ads. The several formats can use the same ads, reformatted versions of the same ads, or different ads (e.g., ads provided by the same advertiser or different advertisers). The several formats can be compared and a print format can be selected for printing.

The print format can be selected based on features of the formats. The features can include estimated revenue generated from the ads. The estimated revenue can include estimated revenue generated for the advertisers, as well as estimated revenue generated for the ad management system for placing the ads from the advertisers. The estimated revenue can be determined using an auction style system, for example, similar to a selection mechanism used for selecting ads for presentation on digital versions of the resources.

The features can also include the number of pages required to print the resource according to the format. For example, if one format increases the number of pages needed by a threshold amount, the format may be considered suboptimal. The features can also include a ratio of space allocated to ads compared to space allocated for the resource. For example, if too much space is allocated for ads, a greater number of ads may be presented to the user, but the increased number of ads may come at a cost, for example, annoying the user and discouraging the user from printing through the ad management system in the future. A threshold ratio can be used, or the ratio can be weighted with other features in an aggregate feature score to select a print format.

One or more advertisements are selected to be printed with the resource (308). The advertisements can be selected based on the content of the resource (e.g., in a similar manner though which advertisements are selected for presentation with the resource at a user device). For example, if the resource is related to basketball, the ads printed with the resource can also be related to basketball or sporting goods or some other related content (e.g., as determined by similarity measures, such as a cosine similarity).

The ads can also be determined based on characteristics of the user requesting the printing of the resource. For example, if the print request is determined to have been received from a male user between the ages of eighteen to thirty-five, ads appropriate to such a demographic can be selected. The ads can also be determined based on a geographic location. For example, if the resource that is being printed is a map, ads can be selected for stores found along the route being printed. Similarly, the ads that are selected can be from advertisers that have a physical business location that is within a threshold distance of the geographic location of the cloud printer (e.g., as specified by the user). Ads can also be selected based on space available on the page with the resource. The ads selected can also be print versions of the ads shown with the digital version of the resource on a display. Combinations of these and other factors can be used to select the ads.

The ads can be ads tailored specifically to be printed with the resource. For example, online ads often include interactive elements, such as hyperlinks to advertiser pages or other resources, that initiate a resource request in response to online user interaction with the advertisement. Including hyperlinks on print ads would be less useful, as the printed hyperlinks cannot be selected by the user, and therefore would require the user to manually enter the hyperlink into a browser. The ads can instead include printed information, such as QR codes, that can allow smartphones or other computing devices to more effectively be directed to the location specified by the ads. The ads can also include coupons for use in brick and mortar stores. For example, an ad shown online can be provided by Example Sporting Goods, including a coupon for use on the online site ExampleSportingGoods.com. Example Sporting Goods can provide a print version of the same ad, the print version including a paper coupon that is redeemable when presented at a physical location at which Example Sporting Goods operates, such as a retail store in which the user can physically present the coupon for redemption.

Data are provided to a printer (308). The data specify the formatted resource and ads that will be printed, and include a command that causes the cloud printer to print the formatted resource and ads according to the print format. The cloud printer can be specified by the user, and the data can be addressed to the specified cloud printer. In some implementations, the cloud printer last used by the user can be selected as a default printer.

The selected printers can also include default options, such as paper size, double-sided printing, and other printing options. The default options can be determined through communication with the cloud printer, specified by the user, and/or by various factors, such as information about the user or geographic location. For example, if the printer is located in the United States, a default paper size can be 8.5 inches by 11 inches, while a default paper size for a printer located in Japan can be 297 mm by 210 mm (i.e., A4 paper size).

In some implementations, the request to print the resource can be received by a cloud printing system. The cloud printing system can reformat the resource for printing, as described above and request that the ad management system provide ads to be printed with the resource. In some implementations, the cloud printing system can format the resource for printing and specify spaces, or slots, for ads. The cloud printing system can submit a request for ads to the ad management system, specifying features of the ad. For example, the cloud printing system can request a specific number of ads with specific dimensions or proportions and a type of ad. For example, if the resource is an article about dog shows, the ad request can request a 6.5 inch by 2 inch ad related to dogs for presentation as a banner ad across the top of the printed version of the article. The cloud printing system can provide the data for printing to the cloud printer.

While the description above includes advertisers providing advertisements to an ad management system, similar techniques can be used for content providers providing content items to a content management system.

Figure 4:
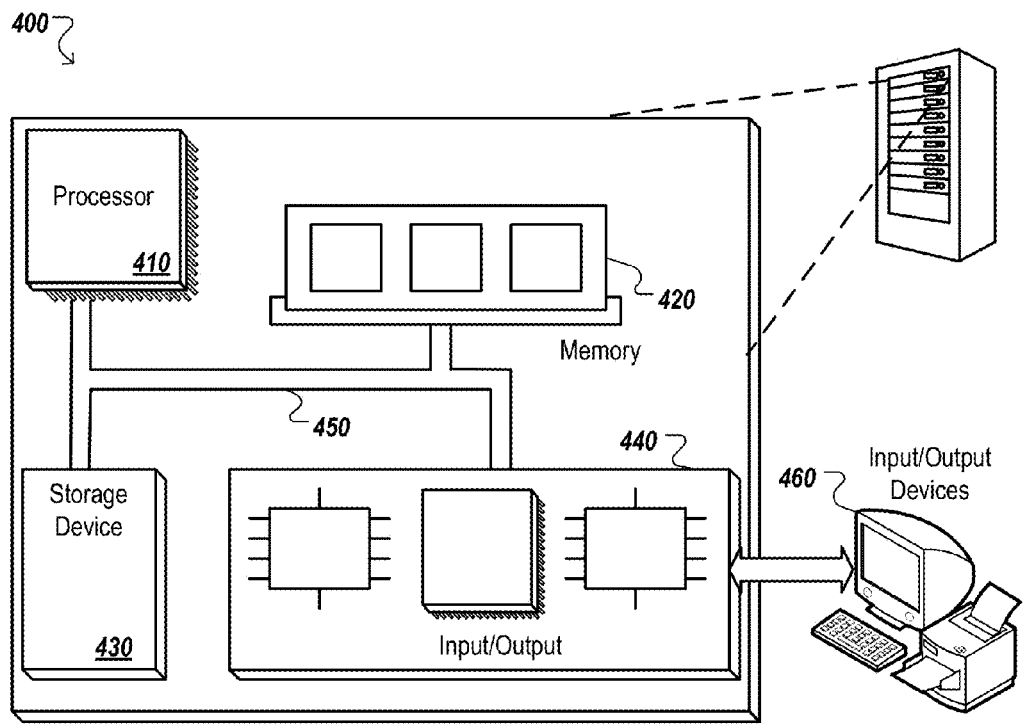
FIG. 4 is a block diagram of an example computer system.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460.

Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more apparatus, the method comprising:
   receiving, from a computing device, a request to print an online resource that is presented at a user device according to a presentation format in which a first advertisement is presented at a first presentation position of the online resource, the request specifying a cloud printer at which the online resource is to be printed, the cloud printer being connected to a different local network than the computing device;

selecting, by the one or more apparatus and in response to receiving the request to print the online resource, a print format specifying a second presentation position that differs from the first presentation position;

selecting, by the one or more apparatus and for inclusion in a print-out of the online resource, a second advertisement that was not presented with the online resource based, at least in part, on characteristics of the second presentation position and content of the online resource; and providing data that cause the resource and the second advertisement to be printed at the cloud printer according to the print format.

2. The method of claim 1 further comprising:

determining that a print-out of the online resource will not comply with specified print-out parameters when the online resource is printed according to the presentation format; and wherein selecting the print format is performed in response to the determination that the print-out will not comply with the specified print-out parameters.

3. The method of claim 1, further comprising:

determining that a portion of the online resource will be occluded by the first advertisement when the online resource is printed by the cloud printer according to the presentation format; and wherein selecting the print format is performed in response to the determination that the portion of the online resource will be occluded.

4. The method of claim 1, further comprising:

determining that a first number of pages used by the cloud printer to print the online resource according to the presentation format is greater than a second number of pages used by the cloud printer to print the online resource according to the print format; and wherein selecting the print format is performed in response to the determination that the first number of pages is greater than the second number of pages.

5. The method of claim 1, wherein selecting the second advertisement comprises selecting an advertisement provided by an advertiser that has a business location that is within a threshold distance of a geographic location of the printer.

6. The method of claim 1, wherein selecting the second advertisement comprises selecting an advertisement in which an interactive element of the first advertisement that initiates a resource request in response to online user interaction with the first advertisement is replaced with a printed element that provides printed information to the user.

7. The method of claim 6, wherein selecting the second advertisement comprises selecting, as the second advertisement, an advertisement that includes a QR code.

8. The method of claim 1, wherein selecting the second advertisement comprises selecting an advertisement that includes a coupon for a business that is redeemable when presented at a physical location at which the business operates.

9. The method of claim 1, wherein selecting a print format comprises:

generating a plurality of formats for the print-out of the online resource; and selecting the print format from among the generated plurality of formats based on features of each of the formats, the features for each of the formats specifying at least one of estimated revenues from the advertisements that are presented according to the format, a number of pages needed for printing the online resource according to the format, and a ratio of space allocated to advertisements relative to space allocated for the resource.

10. A non-transitory computer storage medium encoded with a computer program, the program comprising instructions that when executed by data processing apparatus cause the data processing apparatus to perform operations comprising:

receiving, from a computing device, a request to print an online resource that is presented at a user device according to a presentation format in which a first advertisement is presented at a first presentation position of the online resource, the request specifying a cloud printer at which the online resource is to be printed, the cloud printer being connected to a different local network than the computing device;

selectin, in response to receiving the request to print the online resource, a print format specifying a second presentation position that differs from the first presentation position;

selecting for inclusion in a print-out of the online resource, a second advertisement that was not presented with the online resource based, at least in part, on characteristics of the second presentation position and content of the online resource; and providing data that cause the resource and the second advertisement to be printed at the cloud printer according to the print format.

11. A system comprising:

one or more data processing apparatus; and a data store coupled to the data processing apparatus, the data store storing instructions that cause the data processing apparatus to perform operations comprising:

receiving, from a computing device, a request to print an online resource that is presented at a user device according to a presentation format in which a first advertisement is presented at a first presentation position of the online resource, the request specifying a cloud printer at which the online resource is to be printed, the cloud printer being connected to a different local network than the computing device;

selecting, in response to receiving the request to print the online resource, a print format specifying a second presentation position that differs from the first presentation position;

selecting for inclusion in a print-out of the online resource, a second advertisement that was not presented with the online resource based, at least in part, on characteristics of the second presentation position and content of the online resource; and providing data that cause the resource and the second advertisement to be printed at the cloud printer according to the print format.

12. The system of claim 11, wherein the instructions further cause the data processing apparatus to perform operations comprising:

determining that a print-out of the online resource will not comply with specified print-out parameters when the online resource is printed according to the presentation format; and wherein the instructions cause the data processing apparatus to select the print format in response to the determination that the print-out will not comply with the specified print-out parameters.

13. The system of claim 11, wherein the instructions further cause the data processing apparatus to perform operations comprising:
   determining that a portion of the online resource will be occluded by the first advertisement when the online resource is printed by the cloud printer according to the presentation format; and
   wherein the instructions cause the data processing apparatus to select the print format in response to the determination that the portion of the online resource will be occluded.

14. The system of claim 11, wherein the instructions further cause the data processing apparatus to perform operations comprising:
   determining that a first number of pages used by the cloud printer to print the online resource according to the presentation format is greater than a second number of pages used by the cloud printer to print the online resource according to the print format; and
   wherein the instructions cause the data processing apparatus to selecting the print format in response to the determination that the first number of pages is greater than the second number of pages.

15. The system of claim 11, wherein the instructions that cause the data processing apparatus to select the second advertisement include instructions that cause the data processing apparatus to select an advertisement provided by an advertiser that has a business location that is within a threshold distance of a geographic location of the printer.

16. The system of claim 11, wherein the instructions that cause the data processing apparatus to select the second advertisement include instructions that cause the data processing apparatus to select a print version of the first advertisement in which an interactive element of the first advertisement that initiates a resource request in response to online user interaction with the first advertisement is replaced with a printed element that provides printed information to the user.

17. The system of claim 16, wherein the instructions that cause the data processing apparatus to select the second advertisement includes instructions that cause the data processing apparatus to select, as the second advertisement, a print version of the first advertisement that includes a QR code.

18. The system of claim 11, wherein instructions that cause the data processing apparatus to select the second advertisement include instructions that cause the data processing apparatus to select an advertisement that includes a coupon for a business that is redeemable when presented at a physical location at which the business operates.

19. The system of claim 11, wherein instructions that cause the data processing apparatus to select a print format instructions that cause the data processing apparatus to perform operations including:
   generating a plurality of formats for the print-out of the online resource; and
   selecting the print format from among the generated plurality of formats based on features of each of the formats, the features for each of the formats specifying at least one of estimated revenues from the advertisements that are presented according to the format, a number of pages needed for printing the online resource according to the format, and a ratio of space allocated to advertisements relative to space allocated for the resource.

* * * * *